May 9, 1933.  F. E. GRUNWALDT  1,908,417
CIRCULATING HUMIDIFYING HEATING SYSTEM
Filed Jan. 24, 1929   2 Sheets-Sheet 1
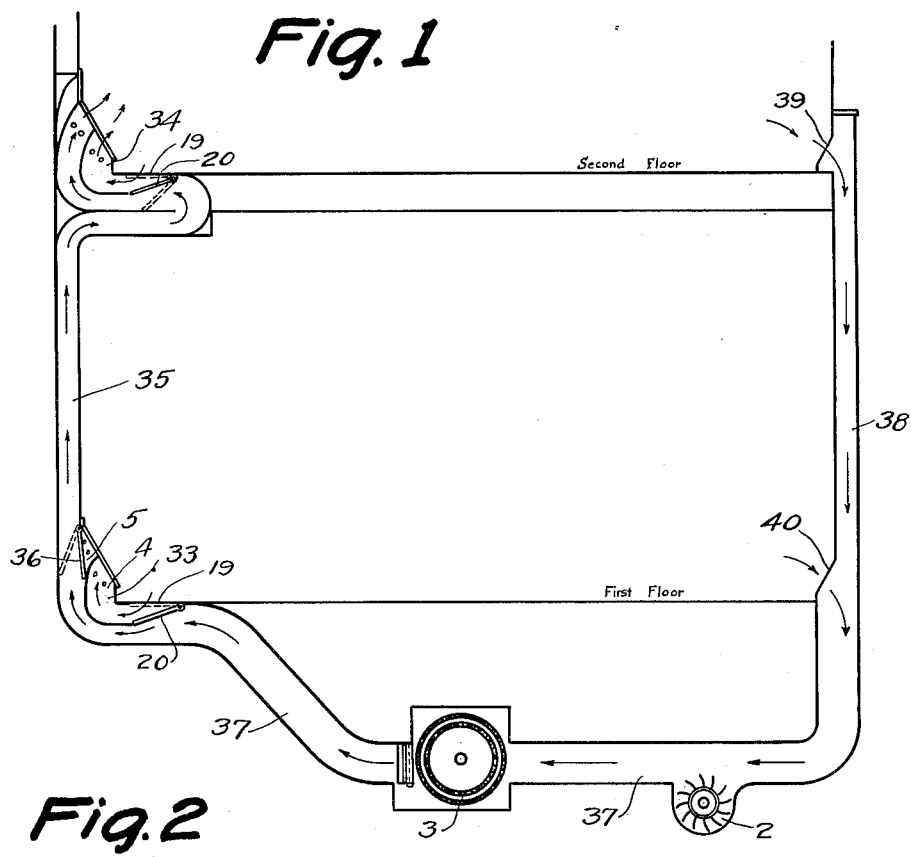
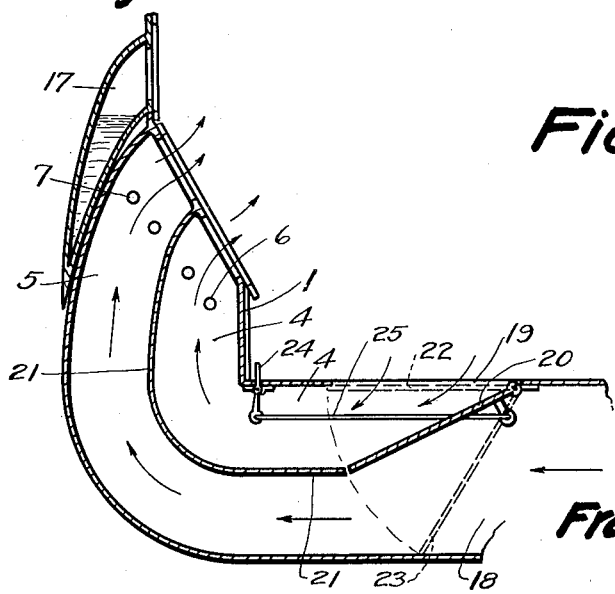
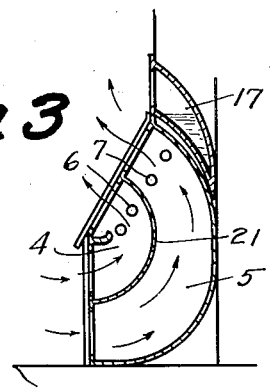
INVENTOR
Frank E. Grunwaldt
BY
Harry Bowen
ATTORNEY May 9, 1933.  F. E. GRUNWALDT  1,908,417
CIRCULATING HUMIDIFYING HEATING SYSTEM
Filed Jan. 24, 1929  2 Sheets-Sheet 2
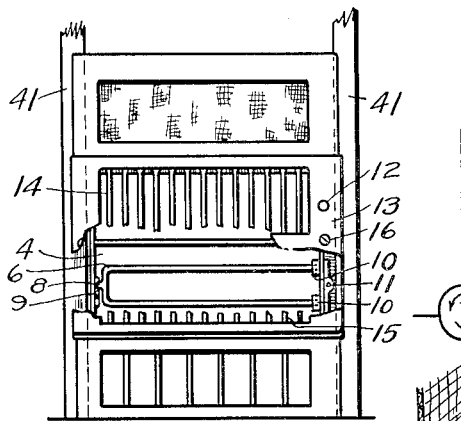
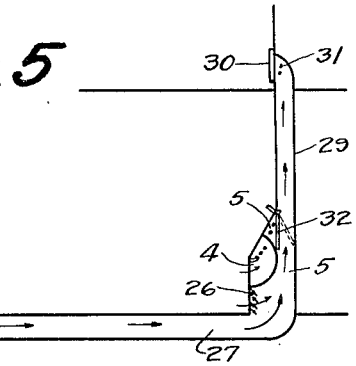
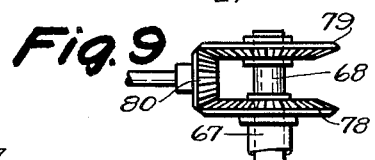
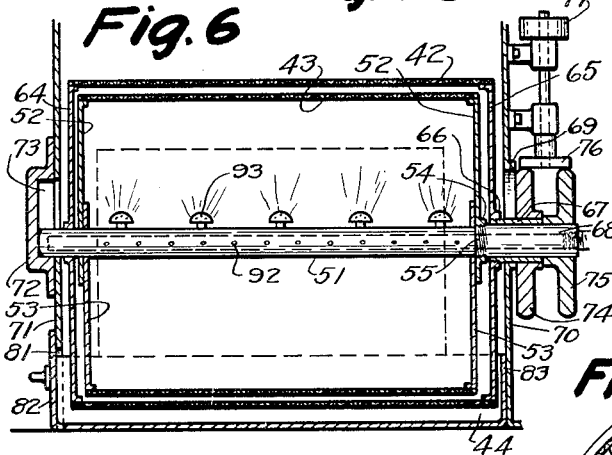
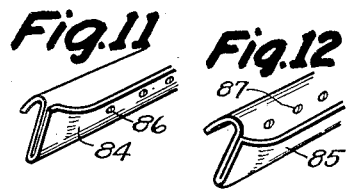
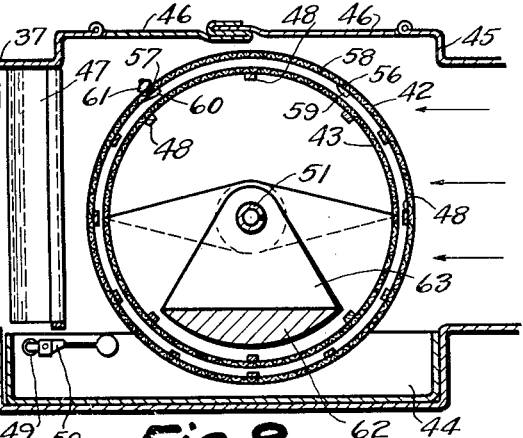
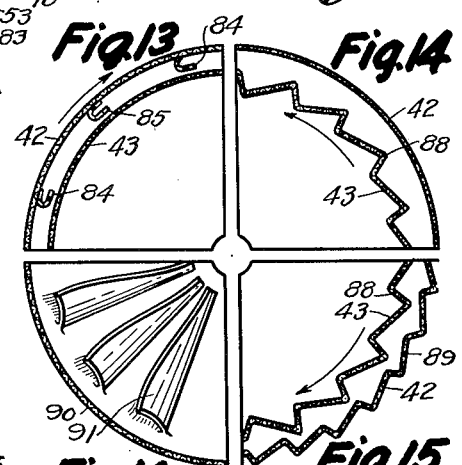
INVENTOR
Frank E. Grunwaldt
BY Harry Bowen
ATTORNEY Patented May 9, 1933

1,908,417

UNITED STATES PATENT OFFICE

FRANK E. GRUNWALDT, OF SEATTLE, WASHINGTON

CIRCULATING HUMIDIFYING HEATING SYSTEM

Application filed January 24, 1929. Serial No. 334,779.

The invention is a circulating heating system in which moisture is supplied to the air, and the means for raising the temperature of the air is located in the outlet openings so that the air is drawn into the system by the upward and outward action of the heated air around the heating devices and the system is also provided with an auxiliary circulating fan and a filter and humidifier.

One object of the invention is to provide an efficient means for heating by electricity.

Another object of the invention is to provide a simple and efficient means for filtering and humidifying the air in a heating system.

Another object of the invention is to provide an electric heater which will automatically circulate air, drawing the cold air from the bottom and discharging the heated air from the top.

Another object of the invention is to provide a circulating electric heater which is provided with a plurality of heating elements and partitions between the elements to prevent the heat from one element interfering with the other.

A further object of the invention is to provide a circulating electric heater having a plurality of passages in which the incoming air may readily be shifted from one passage to the other.

A still further object of the invention is to provide a filter for a heating system in which the air is passed through two cylindrical water screens rotating in opposite directions and provided with means for maintaining films of water over the entire surface of the screens.

And a still further object of the invention is to provide an electrical heating system with a simple and economical means for circulating, humidifying and filtering air passing therethrough.

With these ends in view the invention embodies a casing having a plurality of passages extending from the bottom to the top thereof, electric heating elements in the outlet openings of the passages, said passages being adaptable to open at the bottom of the casing and also to extend across to the opposite side of the inclosure and said passages being provided with auxiliary circulating means and a suitable humidifying filtering device.

Other features and advantages of the invention will appear from the following description taken in connection with the drawings, wherein:—

Figure 1 is a view showing the general arrangement of the entire system.

Figure 2 is a cross section through one of the heating devices.

Figure 3 is a similar view showing a device of an alternate design.

Figure 4 is a view showing a front elevation of one of the heating devices.

Figure 5 is a view showing an alternate installation in which a heating device is shown in combination with a plurality of alternately arranged passages.

Figure 6 is a longitudinal section through the filter and humidifier.

Figure 7 is a detail showing the filter screen.

Figure 8 is a cross section through the filter and filter casing.

Figure 9 is a view showing an alternate arrangement of the filter drive.

Figure 10 is a sectional plan through the eliminators at the discharge end of the filter.

Figure 11 is a view showing a detail of one of the filter buckets.

Figure 12 is a similar view showing an alternate bucket in which openings therein are placed in the opposite side from those of the buckets shown in Figure 10.

Figure 13 is a view showing a quadrant of the filter showing the buckets shown in Figures 10 and 11 in combination therewith.

Figure 14 is a similar view of the filter showing the inner cylindrical screen corrugated.

Figure 15 is a similar view showing both of the screens corrugated.

Figure 16 is a similar view showing a single screen with fan plates at the inner surface of the ends which will cause it to automatically rotate as the air passes through the device.

In the drawings the device is shown as it would be made, wherein numeral 1 indicates the heater casing, numeral 2 the fan, and numeral 3 the filter and humidifier.

The heating device 1 may be constructed in a plurality of arrangements so that the cold air may be drawn in from the surface of the front of an inclosure in which the device may be located or through a passage under the front leading to the opposite side of the inclosure or through a passage from an inlet opening from the floor above or from any other suitable point. The outlet openings of these heating devices are however similar in all designs. In all of the designs the outlet openings will be referred to by the numerals 4 and 5 and it will be observed that both of these openings may open into the room, as shown in Figure 3, or one may open into the room, as shown in Figure 2, and the other into an air duct which may pass to any suitable point. The electric heating element in the passage 4 will be referred to by the numeral 6 and the element in the passage 5 by the numeral 7. These elements may be of any suitable type or design and may be arranged in any suitable manner. In the design shown they may be arranged, as shown in Figure 4, with the element in the form of a U with a projection 8 at one end which may be placed into a recess in a bracket 9 and the opposite ends fitting into sockets 10 which may be connected to any suitable source of electric current so that current will be supplied to their respective ends. The source of electric current may be provided with electric switches 11 which may be operated by buttons 12 extending through the face of the casing so that the heater may readily be turned on or off from the casing. The individual heaters are independently connected so that either one or both may be used as may be desired. It will therefore be observed that it will be possible to maintain practically any temperature desired in an inclosure as many heating elements may be used as desired and they may be turned off and on to provide any suitable temperature. It will be observed that with the elements arranged in this manner they may readily be removed and replaced as the projection 8 may be raised and drawn forward and the opposite ends may readily be removed from the porcelain sockets. The front of the device is provided with a cover plate 13 having an upper grill 14 and a lower grill 15 and this plate is held in place by screws 16 so that it is readily removable.

In the designs shown in Figures 2 and 3 the device is provided with a water pan 17 which is placed in an opening just above the outlet opening of the passage 5 and this pan is shaped on a curve as shown so that it may readily be withdrawn from the opening at the front. Some of the heat from the heating elements will be conducted through the wall of the casing to this pan and will cause the water to evaporate slowly so that it will supply moisture to air in the inclosure. These water pans however, may be omitted when it is desired to carry the air passage 5 above the device, as shown in the device on the first floor of Figure 1.

The device shown in Figure 2 extends through the floor and the passages 4 and 5 open into a duct 18 which may extend to any suitable point. The upper passage 4 is provided with an opening 19 through the floor of the inclosure in which the device may be installed and below this opening is a damper 20 which is pivotally mounted in the duct 18 and arranged so that it may cooperate with a partition 21 between the passages 4 and 5 to close the passage 4 to the duct 18, or may be raised to the position shown by the dotted lines 22 so that it will close the opening 19 in which case both of the passages 4 and 5 will open into the duct 18, or it may be lowered to the position indicated by the dotted lines 23 so that it will close the duct 18 and permit air to enter both of the passages 4 and 5 through the opening 19. The damper 20 may be operated automatically by the pressure of the fan or by a lever 24 through a rod 25 as shown or by any other suitable means.

It will be noted that in the device shown in Figure 3 both of the passages 4 and 5 open into the lower part of the inclosure and both discharge directly into the inclosure a short distance above the inlet openings. This is a very simple arrangement and may be used very effectively. It may be combined, however, with the arrangement shown in Figure 5 in which both of the passages may be open to the room, or the lower opening of the passage 5 may be provided with a plurality of baffles 26 which will form a closure and the lower part may open into a passage 27 which will extend below the floor and upward to an opening 28 at the opposite side of the inclosure. The passage 27 may also extend upward through a vertical section 29 and may open into an inclosure or room on the floor above, as shown at the point 30. A heating element 31, which may be similar to one of the elements 6 or 7, may be located in the upper end of this passage and adjacent the opening therein. The passage 5 may also be provided with a damper 32 which may be used to close the passage to the opening directly above the opening of the passage 4, as shown, or may be moved to the position shown in dotted lines so that it will close the upper portion 29 of the passage and cause the air to discharge out through the opening of the passage 5 directly above the opening of the passage 4.

The general arrangement, however, as shown in Figure 1, contains a heating device which is indicated by the numeral 33, on the first floor and another similar device, as indicated by the numeral 34, on the second floor with both of the devices provided with an opening directly into the inclosure in which the devices are located and also connected through ducts to openings on the opposite sides of the inclosure or at remote points and the ducts provided with auxiliary circulating means and a humidifying filter. In this design the heating device 33 is similar to the device which is shown in Figure 2 except that the water pan 17 is omitted and the passage 5 extends upward through a vertical duct 35 which may be located in the wall and it will be observed that the duct 35 extends outward and backward at the upper end to provide space for the damper 20 and opening 19. The device 34 is similar to the device shown in Figure 2 and may be controlled in a similar manner to permit the cold air to enter from the room or to be drawn through the duct. The device 33 is also provided with a damper 36 which is similar to the damper 32, as shown in the device shown in Figure 5, and it will be observed that this damper may close the lower end of the passage 35 or may close the opening of the passage 5 so that all or part of the air from the duct will pass upward to the device shown. In this device the duct, which is indicated by the numeral 37, extends below the floor and is connected to a vertical duct 38, which may be located on the opposite side of the inclosure or in another inclosure or at any suitable point and it will be observed that the duct 38 is provided with an inlet opening 39 on the second floor and a similar inlet opening 40 on the first floor.

It will also be understood that the heating devices may be of any other suitable design and may have any suitable number of passages as indicated by the numerals 4 and 5, and may be connected to inlet openings or passages of any suitable type or design and which may be arranged in any suitable manner. These devices, which may be located in the wall of a building adjacent the floor, may be positioned between the studding, as shown in Figure 4. The studding in Figure 4 is indicated by the numeral 41 and it will be observed that the device is made of such a size that it will fit between the studding.

The auxiliary fan 2 may be positioned in the duct 37, as shown in Figure 1, or in any other suitable manner or any other type of fan may be used. In this design the fan is positioned in one side of the duct so that a free passage is provided over the fan blades so that air may pass through the duct when the fan is stationary and the fan may only be used when it is desired to accelerate the velocity of the air passing through the duct.

The filter and humidifier 3 may also be located in the duct 37 or may be located in any suitable position so that air passing through the heating devices may pass through it. The filter 3 is made as shown in Figures 6 and 8, however it may also be made in the alternate designs shown in Figures 13 to 16 inclusive. The filter shown in Figures 6 and 8 is made with an outer cylindrical screen 42 and an inner cylindrical screen 43 which rotate in opposite directions and at the lower side of the screens is a water pan 44 which is positioned so that the screens will pass through the water as they rotate. The screens are made of a comparatively fine mesh backed by a heavier mesh, as shown in Figure 7, so that they will pick up the water and the water will form a film over the screens. By rotating the screens in opposite directions one screen will pick up the film at one side and the other at the opposite side so that the air will be washed twice as it passes through the filter. The filter is located in a housing 45 which is provided with hinged doors 46 at the top and the duct 37, or any duct through which a fluid to be washed may pass, is attached to the sides of the housing 45. Eliminators, as indicated by the numeral 47, are positioned at one side of the housing and shaped, as shown in Figure 10, so that moisture in air passing through them will be caught in pockets in the outer edge, and will drip downward so that it will pass back to the water pan 44. These will eliminate practically all freely suspended moisture from the air as it leaves the washer or filter, thereby humidifying the air. The screens may be provided with transverse re-enforcing struts 48, as shown in Figure 8, which will prevent sagging. The pan 44 may be provided with an inlet pipe 49, the opening of which is provided with a float valve 50, which will maintain a constant water level in the pan 44. The screens are mounted upon a shaft 51, as shown in Figure 6, and it will be observed that the inner screen 43 is made in two sections with the end plates overlapping, as shown. The end plates of the upper section are indicated by the numeral 52 and those of the lower section, which pass inside of the plates of the upper section, by the numeral 53. The inner ends of the plates 52 to 53 are provided with openings through which the shaft passes. The plate 52 at one end is provided with a hub 54 that is threaded so that it may be screwed upon threads 55 of the shaft 51. The outer screen 42 is provided with a removable section which extends from the point 56 to the point 57 and it will be observed that when this section is removed the individual sections of the inner screen 43 may be removed through the opening after the shaft 51 has been withdrawn. The removable section between the points 56 and 57, which is indicated by the numeral 58, is provided with tongues 59 which extend under the edge of the screen at one side and it will be observed that the opposite edge rests upon similar tongues 60 extending from the screen and the section is held in place by thumb screws 61 which extend into the screen.

In the design shown in Figure 8 a comparatively heavy segment, as indicated by the numeral 62, may be supported from the shaft by plates 63 and it will be observed that this member will hang downward so that it will engage the upper surface of the water in the pan 44 and prevent air passing through the device drawing the water out of the pan. It will be noted that this member is omitted in Figure 6 and it will be understood that it may, or may not be used as desired.

The outer screen 42 is mounted upon a disk 64 at one end and a disk 65 at the other which is provided with a hub 66 that is threaded so that a sleeve 67 may be screwed into it. The sleeve 67 is rotatable upon the enlarged end 68 of the shaft 51 and is also rotatably mounted in an elongated slot 69 which forms a bearing in a side 70 of the filter housing. The opposite side of the housing, which is indicated by the numeral 71, is also provided with a bearing 72, which has an elongated slot 73 and it will be noted that the shaft will normally rest in the lower ends of the slots 69 and 73 and may be raised when it is desired to withdraw the pan 44 at the bottom. A wheel 74 having a friction surface at its outer edge is fixedly mounted upon the sleeve 67 and a similar wheel 75 is rigidly mounted upon the enlarged end 68 of the shaft 51 and these wheels are in engagement with a disk 76 which may be located at any convenient point and driven by a pulley 71 or any suitable means. It is also understood that the wheels 74 and 75 may be replaced by gears 78 and 79 and these gears may be rotated by a pinion 80, as shown in Figure 9, or any other suitable means may be used for rotating the shaft and sleeve so that they will rotate in opposite directions. It will be noted that as the disks 76 or the gear 80 rotate they will move one of the disks or gears in one direction and the other in the opposite direction and these will in turn rotate the screens 42 and 43 in opposite directions.

The pan 44 may be made as shown in Figures 6 and 8 so that it will slide into an opening 81 in the side 71 of the housing and the opening 81 will be closed by an extension at the upper edge of the end 82 of the pan and with the screens raised the pan will pass through this opening until the opposite end 83 engages the side 70 of the housing. It is understood, however, that the pan may be of any other suitable design and may be arranged in any other suitable manner.

It is understood that although the preferred design of the filter screens is shown in Figures 6 and 8 they may also be made in either of the designs shown in Figures 13 to 16. The screens are similar to the screens shown in Figures 6 and 8 except that in Figure 13 the outer screen 42 is provided with pockets 84 and 85 which are made as shown in Figures 11 and 12 of flat pieces of plate which may be secured to the inner surface of the screen 42. It will be observed that as the screen rotates in the direction of the arrow the pockets will pick up water from the pan 44 and carry it upward and drop it upon the screens. The pocket 84 is provided with openings 86 in the outer side so that the water will pass outward and the pocket 85 is provided with openings 87 in the inner side so that the water will flow outward upon the screen 42 as the pockets are raised. These pockets may be arranged alternately so that one will dump the water upon the inner screen and the next will dump it upon the outer screen or may be arranged in any suitable manner to accomplish any desired result. It is also understood that the openings 86 and 87 may be omitted and the pockets provided with any other suitable means for directing the flow of water as they reach the upper part of the filter.

In the design shown in Figure 14 the outer screen 42 is similar to the screen shown in Figures 6 and 8 and the inner screen 43 is provided with corrugations 88 and it will be observed that as the screen rotates in the direction of the arrow air passing through the filter will engage the flat surfaces of the corrugations at the upper side and cause the screen to rotate.

In the design shown in Figure 15 both of the screens are provided with corrugations, as indicated by the numerals 88 and 89, and the corrugations are arranged in such a manner that one screen will rotate in one direction and the other in the opposite direction. The corrugations 88 in the screen 43 are shown opposite to those in Figure 14 and it will be observed that as air passes through the filter the inner screen will rotate in the direction of the arrow shown in Figure 15 and the outer screen will rotate in the opposite direction as the flat or vertical surfaces will be perpendicular to the path of the air when on the upper side of the device. It will also be noted that these corrugations increase the surface or filtering area.

In the design shown in Figure 16 only one screen is used which is indicated by the numeral 90 and the ends of this screen are provided with vanes 91 which are arranged so that they will rotate the screen as air passes through the device. It will be understood that these vanes may be arranged in any suitable position and may be of any suitable shape so that as they are engaged by the air they will cause the device to rotate.

It will be noted that the shaft 51 is hollow with the smaller end inclosed and the opposite end provided with pipe threads so that a pipe may be attached to the end of the shaft with any suitable fitting which will permit it to rotate. The shaft is perforated, as indicated by the openings 92 and also provided with spray devices 93 so that water under pressure may be supplied through the shaft to clean the screens from the interior.

By spraying water through the shaft against the inside of the screen with the screens revolving slowly the screens may be thoroughly washed and cleaned. It will be understood, however, that the shaft may be made of a piece of pipe and either the perforations or spray devices may be omitted and also that any other suitable means may be used for supplying a spray under pressure to the interior of the screens.

This filter and humidifier, which is shown in combination with an electric heating system, will clean the air passing through the system and also supply it with the proper consistency of moisture. It will positively remove all dust and the like from the air as the air passing through the screens will break up the film of water, practically atomizing it and even when the film is broken from the screen it will retain sufficient moisture to arrest dust or the like in the air. The device is practically noiseless as the screens passing through the water will move very quietly and the operating parts move very slowly. The single screen will of course not present as great resistance to air passing through the device as will the double screen and therefore the air pressure may be considerable less with a single screen. At the same time the device will not restrict the flow of air through the duct as the screen is of sufficient area to provide greater free passage than the area of the duct. The corrugated screens provide suitable additional surface area and may therefore be considered as more efficient than the somewhat cylindrical screens. It will also be noted that this filter and humidifier may be made of rust proof metal, may be placed on either the suction or discharge side of the fan, may be used as a dry filter with the screens stationary, and may also be used for any other purpose or in any other type of system.

The heating device shown in Figures 1, 2 and 3 may also be located or built in a fireplace as each device is operated independently and may therefore be positioned at any suitable point as each unit also provides an independent circulating system as the heating elements will draw air upward through the device. It will be noted that the damper 20 may hang freely or be counterweighted so that the air pressure from the fan will automatically raise it to close the opening 19 whereas when the fan is not operated it will drop to the position shown in dotted lines and indicated by the numeral 23 in Figure 2.

It will be understood that changes may be made in the construction without departing from the spirit of the invention, one of which changes may be in the use of the heating device, fan and filter in any other combination or arrangement. Another may be in the omission of the fan or filter from the heating system and still another may be in the use of heating devices, in which the heating elements are positioned in the outlet openings of any other design or arrangement.

The construction will be readily understood from the foregoing description. In use the device may be installed, as shown in Figure 1, or a heating device made in any of the designs shown or described may be used independently. With an installation using any of the designs it will be observed that the heat generated by the heating elements will cause circulation drawing cold air in from the floor of an inclosure and discharging it a comparatively short distance from the floor and the heating elements may be turned on or off within the inclosure being heated so that heat supplied to a room may be controlled and operated by the occupant of the room and therefore only as much heat as is desired may be generated and furthermore the heat is generated at the point desired and not utilized in heating long ducts through cold areas which is true when heat is generated at a remote point and forced through ducts to rooms or inclosures.

The apparatus is therefore developed and designed to provide as much heat as may be desired at the point at which it is desired and with the greatest possible efficiency.

This device therefore provides a very efficient and economical heating system as it is inexpensive to install and may be economically operated. It therefore provides an electric heating system that is not only adaptable for elaborate and expensive homes but is within the reach of the average.

Having thus fully described the invention, what I claim as new and desire to secure by Letters Patent, is:—

1. In a heating system of the class described, a suitable heating apparatus comprising casings with a plurality of vertical passages, the upper ends of the said passages opening into an inclosure and the lower ends adaptable to draw air from the lower part of the said inclosure, heating elements adjacent the upper and open ends of the said passages, a duct connecting the lower ends of the said passages to suitable intake openings at remote points, an auxiliary fan positioned in one side of the said duct, a filter also positioned in the said duct, and means in the said duct for closing the said duct to the said passages.

2. In a heating device of the class described, a casing having a plurality of vertical passages, the upper end of the said casing in which the openings of the upper ends of the passages are located being slightly inclined, the lower portion of the said casing having openings therein connecting with the lower ends of the said passages, and a plurality of independently operated heating elements adjacent the upper ends of the said passages and positioned within the passages.

3. In a heating device of the class described, a casing having a plurality of vertical passages, the upper end of the said casing in which the openings of the upper ends of the passages are located being slightly inclined, the lower portion of the said casing having openings therein connecting with the lower ends of the said passages, a plurality of independently operated heating elements adjacent the upper ends of the said passages, and a suitable water pan in the upper end of the said casing adjacent the said passages.

4. In a heating device of the character described, a casing having a plurality of vertical passages opening at the upper end thereof, independently operated heating elements in the upper ends of the said passages, ducts connecting the lower ends of the said passages to inlet openings at remote points, and means between the said vertical passages through the ducts and duct for opening and closing the said passages to the said inlet openings respectively.

5. In a device of the character described, a casing having a plurality of vertical passages opening at the upper end of the casing, independently operated heating elements positioned in the upper ends of said passages, means for connecting the lower ends of the passages to inlet openings at remote points, a suitable auxiliary circulating device cooperating with the said passages, and a suitable filter and humidifier in the said passages.

6. In heating apparatus of the recirculating type, an enclosure having vertical ducts in the walls thereof, heating elements in the said ducts, openings at the upper and lower ends of the said ducts, horizontal ducts connecting the lower ends of the said vertical ducts to openings at remote points, and means in the said ducts for opening or closing the lower ends of the said vertical ducts to the said horizontal ducts and to the said openings at their lower ends.

In testimony whereof I affix my signature.

FRANK E. GRUNWALDT.